US008824317B2

(12) United States Patent
Kajihara

(10) Patent No.: US 8,824,317 B2
(45) Date of Patent: Sep. 2, 2014

(54) PARALLEL CALCULATION SYSTEM, AND METHOD AND PROGRAM THEREOF

(75) Inventor: Nobuki Kajihara, Tokyo (JP)

(73) Assignee: NEC Corporation, Tokyo (JP)

( * ) Notice: Subject to any disclaimer, the term of this patent is extended or adjusted under 35 U.S.C. 154(b) by 402 days.

(21) Appl. No.: 13/133,031

(22) PCT Filed: Dec. 2, 2009

(86) PCT No.: PCT/JP2009/070251
§ 371 (c)(1),
(2), (4) Date: Jun. 6, 2011

(87) PCT Pub. No.: WO2010/064661
PCT Pub. Date: Jun. 10, 2010

(65) Prior Publication Data
US 2011/0261830 A1    Oct. 27, 2011

(30) Foreign Application Priority Data
Dec. 4, 2008 (JP) .................. 2008-309813

(51) Int. Cl.
*H04L 12/54* (2013.01)
*G06F 15/173* (2006.01)

(52) U.S. Cl.
CPC ............... *G06F 15/17375* (2013.01)
USPC ............... 370/252; 370/389; 370/401

(58) Field of Classification Search
USPC .......... 370/229, 252, 254, 389–392, 400, 401
See application file for complete search history.

(56) References Cited

U.S. PATENT DOCUMENTS

| 5,724,600 A | * | 3/1998 | Ogi ............................ 712/11 |
| 6,035,421 A | * | 3/2000 | Henno et al. .................. 714/30 |
| 2010/0061389 A1 | * | 3/2010 | Sindhu et al. ................ 370/412 |

FOREIGN PATENT DOCUMENTS

| JP | 9-231187 A | 9/1997 |
| JP | 11-85547 A | 3/1999 |
| JP | 2000155692 A | 6/2000 |
| JP | 2002141915 A | 5/2002 |
| JP | 2002229963 A | 8/2002 |

(Continued)

OTHER PUBLICATIONS

International Search Report for PCT/JP2009/070251 mailed Mar. 9, 2010.

(Continued)

*Primary Examiner* — Yemane Mesfin
*Assistant Examiner* — Mon Cheri Davenport
(74) *Attorney, Agent, or Firm* — Sughrue Mion, PLLC

(57) ABSTRACT

A parallel calculation system includes a plurality of functional nodes and a plurality of network switches, which serve as part of a communication path for communication between the functional nodes and function as communication channels. As for the functional nodes, a functional node group made up of part or all of a plurality of the functional nodes that the parallel calculation system includes is managed as one group. The network switches include a plurality of input/output ports, which are ports for inputting and outputting the communication request, and a switch, which outputs the communication request that the input/output port inputs to the input/output port. The network switches manage a communication bandwidth for each of the communication channels between the functional nodes and control the switch.

21 Claims, 13 Drawing Sheets

(56) References Cited

FOREIGN PATENT DOCUMENTS

| | | |
|---|---|---|
| JP | 2002374286 A | 12/2002 |
| JP | 2003216565 A | 7/2003 |
| JP | 2005018753 A | 1/2005 |
| JP | 2006065812 A | 3/2006 |
| JP | 2006318477 A | 11/2006 |
| JP | 2006319849 A | 11/2006 |
| JP | 2008140120 A | 6/2008 |

OTHER PUBLICATIONS

H. Nakada, "Trends for Virtualization Technique and Introduction to Virtual Cluster Management System", GridWorld 2007, DataCenter Conference & Demo 2007, May 2007.

Fujitsu Limited, "Linux Virtual Machine Function", White Paper, [online], Mar. 2008, Internet <URL: http://primeserver.fujitsu.com/primergy/software/linux/products/distribution/pdf/primergy-vm-wp.pdf>.

* cited by examiner

PARALLEL CALCULATION SYSTEM, AND METHOD AND PROGRAM THEREOF

The present application is the National Phase of PCT/JP2009/070251, filed Dec. 2, 2009, which claims priority from Japanese Patent Application No. 2008-309813 filed on Dec. 4, 2008, the entire contents of which being incorporated herein by reference.

TECHNICAL FIELD

The present invention relates to a parallel calculation system, and particularly to a parallel calculation system able to allocate hardware resources to a plurality of applications or processes and perform management, a method and program thereof.

BACKGROUND ART

One example of a parallel processing system pertaining to the present invention is disclosed in NPL 1 and NPL 2. As shown in FIG. 11, a parallel calculation system 2500 is formed by combining hardware and software.

More specifically, the parallel calculation system 2500 includes, as hardware, a plurality of functional nodes 2400, which perform mathematical operations, IO (Input/Output), storing or any other function. In addition to the functional nodes 2400, the parallel calculation system 2500 also has a communication path for communication between the functional nodes 2400.

Furthermore, the parallel calculation system 2500 includes, as software, a virtualization layer 2300, virtual machines 2200 and processes 2100, which are on the virtual machines.

With the above configuration, the parallel calculation system 2500 pertaining to the present invention operates in the following manner.

First, the virtualization layer 2300 assigns a functional node 2400 to each virtual machine 2000 in a dynamic or static manner, enabling the virtual machine 2200 to operate as a virtual parallel calculation system 2500 made up of functional nodes that are independent of each other. Each virtual machine 2200 is able to execute a process 2100 on a virtual parallel machine 2200 assigned to the virtual machine 2200, without sensing the physical assignment of the functional nodes 2400 or the execution state of the other virtual machines 2200. A process 2100 running on a virtual machine 2200 may be a typical OS (Operating System) or application. The functional nodes 2400, which make up physical hardware, communicate with each other via the communication path when performing processes.

Another example of a parallel calculation system that includes a plurality of functional nodes is disclosed in PTL 1. According to a technique disclosed in PTL 1, an object is made of software, enabling the object to realize such functions as mathematical operations, IO (Input/Output), storing or the like.

With the configuration described above, it is possible to realize a parallel calculation system including a plurality of functional nodes.

CITATION LIST

Patent Literature

{PTL 1} JP-A-2000-155692

Non-Patent Literature

{NPL 1} Hideki Nakada. "Trends for Virtualization Technique and Introduction to Virtual Cluster Management System." Tutorial documents of GridWorld 2007, May 31, 2007, p. 5.
{NPL 2} FUJITSU LIMITED. "Linux Virtual Machine Function." White Paper, [online], March 2008, pp. 5 to 14, [Searched on Nov. 21, 2008], Internet <URL: http://primeserver.fujitsu.com/primergy/software/linux/products/distribution/pdf/pri mergy-vm-wp.pdf>

SUMMARY OF INVENTION

Technical Problem

According to the above-described technique disclosed in PTL 1, it is possible to realize a parallel calculation system. However, the problem is that the execution of a certain object could affect the performance of the execution of another object. The reason is as follows.

According to the technique disclosed in PTL 1, under the control of the OS, a calculation system allocates functions, such as mathematical operations, IO (Input/Output), storing or the like, which the calculation system includes as hardware, in a time-sharing manner before executing the functions. That is, the hardware is shared by a plurality of objects. Therefore, what arises as a problem is that the execution of a certain object could affect the performance of the execution of another object.

In that regard, as described above, with the use of the parallel processing system 2500 disclosed in NPL 1 and NPL 2, each virtual machine 2200 can operate without sensing the physical assignment of functional nodes 2400 or the execution state of the other virtual machines 2200. However, the parallel processing system 2500 disclosed in NPL 1 and NPL 2 has the following problems.

The first problem is that a processing overhead is large. The reason is that there is a layer of software, which includes the virtualization layer and the virtual machine, between the physical hardware and the processes, which perform real processing.

The second problem is that a communication bandwidth between the functional nodes allocated to each virtual machine and processes running thereon is not guaranteed. The reason is that, on the communication path that helps physical functional nodes communicate with each other, there is no function of guaranteeing a communication bandwidth for each virtual machine or a communication bandwidth between functional nodes in a virtual machine.

The third problem is the separation of the virtual machines and processes running thereon is not perfect. The reason is that the mapping of each virtual machine to physical hardware is performed by a piece of software called a virtualization layer.

Therefore, the object of the present invention is to provide a parallel calculation system that can perform a plurality of processes with less overhead of a software layer on one parallel calculation system, and a method and program thereof.

Another object of the present invention is to provide a parallel calculation system that can guarantee a communication bandwidth between functional nodes assigned to a process, and a method and program thereof.

Still another object of the present invention is to provide a parallel calculation system that can achieve the separation of a plurality of processes with the use of hardware, a method and program thereof.

Solution to Problem

According to the first aspect of the present invention, there is provided a parallel calculation system including: a plurality of functional nodes having a mathematical operation function, an input/output function or a storage function, or a combination of the functions, for carrying out information processing; and a plurality of network switches, which serve as part of a communication path for communication between the functional nodes and function as communication channels, wherein the functional nodes include: a functional component having a mathematical operation function; an input/output function or a storage function, or a combination of the functions, for carrying out information processing; a functional node input/output port that is a port for inputting and outputting a communication request transferred between the functional nodes for interactive communication between the functional nodes; and a functional node group management unit that manages, as one group, a functional node group made up of part or all of a plurality of the functional nodes that the parallel calculation system includes, and the network switches include: a plurality of input/output ports that are ports for inputting and outputting the communication request; a switch that outputs the communication request that the input/output port inputs to the input/output port; and a bandwidth management unit that manages a communication bandwidth for each of the communication channels between the functional nodes and controls the switch.

According to the second aspect of the present invention, there is provided a parallel calculation method of a parallel calculation system that includes a plurality of functional nodes having a mathematical operation function, an input/output function or a storage function, or a combination of the functions, for carrying out information processing, and a plurality of network switches, which serve as part of a communication path for communication between the functional nodes and function as communication channels, including: a step by the functional nodes of preparing a functional component having a mathematical operation function, an input/output function or a storage function, or a combination of the functions, for carrying out information processing; a step by the functional nodes of preparing a functional node input/output port that is a port for inputting and outputting a communication request transferred between the functional nodes for carrying out interactive communication between the functional nodes; a functional node group management step by the functional nodes of managing, as one group, a functional node group made up of part or all of a plurality of the functional nodes that the parallel calculation method includes; a step by the network switches of preparing a plurality of input/output ports that are ports for inputting and outputting the communication request; a step by the network switches of preparing a switch that outputs the communication request that the input/output port inputs to the input/output port, and a bandwidth management step by the network switches of managing a communication bandwidth for each of the communication channels between the functional nodes and controlling the switch.

According to the third aspect of the present invention, there is provided a management program of a parallel calculation system that includes a plurality of functional nodes having a mathematical operation function, an input/output function or a storage function, or a combination of the functions, for carrying out information processing, and a plurality of network switches, which serve as part of a communication path for communication between the functional nodes and function as communication channels, the program causing a computer to function as the parallel calculation system, wherein: the functional nodes include a functional component having a mathematical operation function, an input/output function or a storage function, or a combination of the functions, for carrying out information processing, a functional node input/output port that is a port for inputting and outputting a communication request transferred between the functional nodes for interactive communication between the functional nodes, and a functional node group management unit that manages, as one group, a functional node group made up of part or all of a plurality of the functional nodes that the parallel calculation system includes; and the network switches include a plurality of input/output ports that are ports for inputting and outputting the communication request, a switch that outputs the communication request that the input/output port inputs to the input/output port, and a bandwidth management unit that manages a communication bandwidth for each of the communication channels between the functional nodes and controls the switch.

Advantageous Effects of Invention

According to the present invention, direct communication between the functional nodes is possible thanks to the functional node group management section without an OS or virtualization layer put therebetween. Therefore, it is possible to reduce the overhead of communication between the functional nodes that make up a process.

DESCRIPTION OF EMBODIMENTS

The following describes in detail a parallel calculation system and a method and program thereof according to an exemplary embodiment of the present invention with reference to the accompanying drawings.

Figure 1:
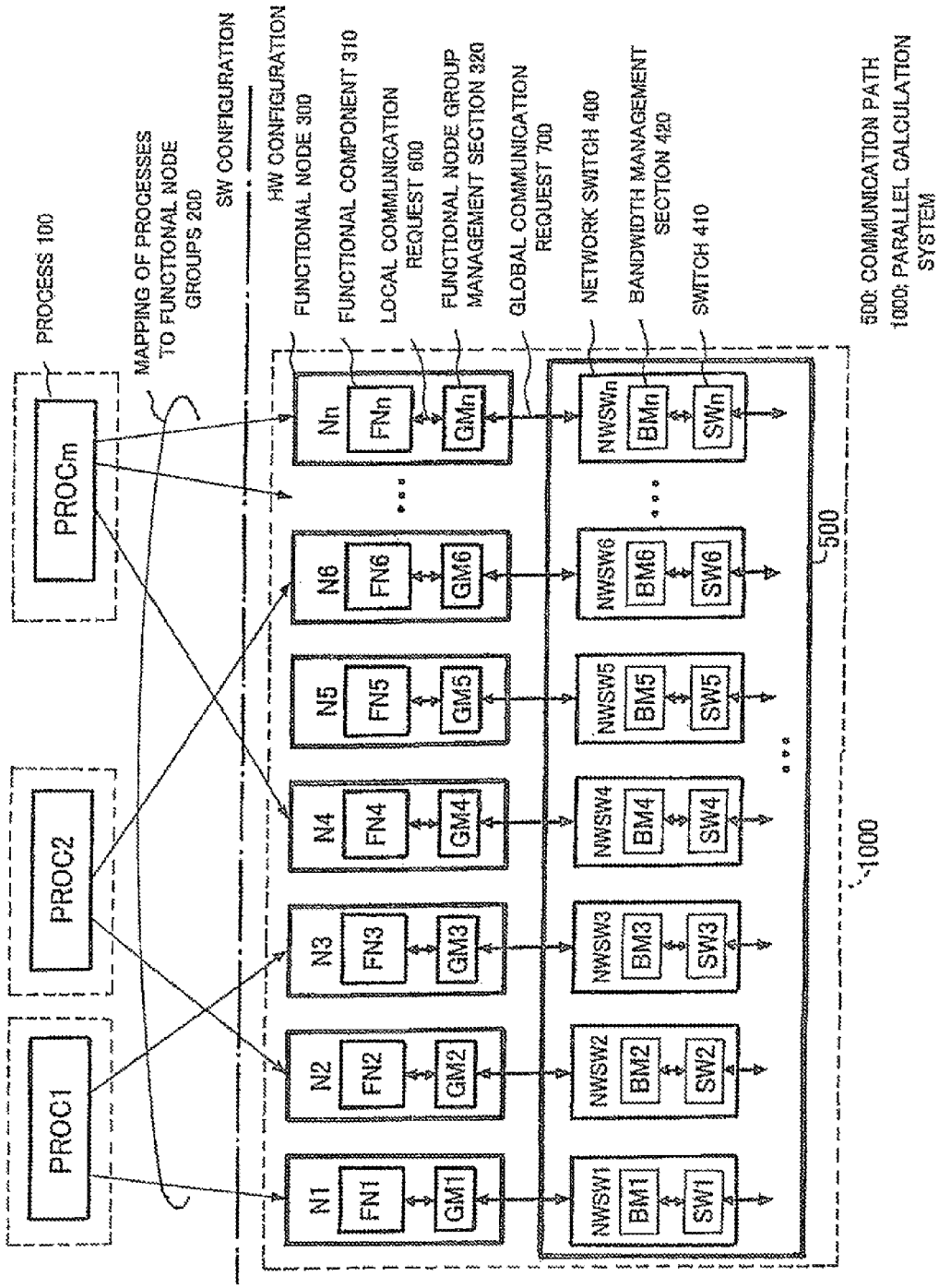
FIG. 1 A block diagram showing the basic configuration of an exemplary embodiment of the present invention.

FIG. 1 shows a first exemplary embodiment of the present invention. According to the present exemplary embodiment, a parallel calculation system 1000 includes a plurality of functional nodes 300 and a communication path 500, which is a communication path for communication between the functional nodes 300.

The functional nodes 300 are nodes that provide a mathematical operation function, an input/output function, a storage function and the like. The functional nodes 300 include a functional component 310, which provides a mathematical operation function, an input/output function, a storage function or the like; and a functional node group management section 320, which manages a group of a plurality of functional nodes collectively as one group.

The communication path 500 includes a plurality of network switches 400. The network switches 400 include a switch 410, which functions as a communication channel between the functional nodes 300; and a bandwidth management section 420, which manages a communication bandwidth between the functional nodes 300.

In the parallel calculation system 100, a plurality of processes 100 is executed. Incidentally, a process 100 may be a typical OS or application. To each process 100, a "functional node group", which consists of a plurality of functional nodes 300, and a "bandwidth" of communication between the functional nodes 300 are assigned.

The mapping 200 of processes to functional node groups mean that processes 100 are mapped to functional node groups, which are assigned to the processes 100. The mapping is carried out by the functional node group management sections 320, which the functional nodes 300 include, and the bandwidth management sections 420, which the network switches 400 include.

Figure 2:
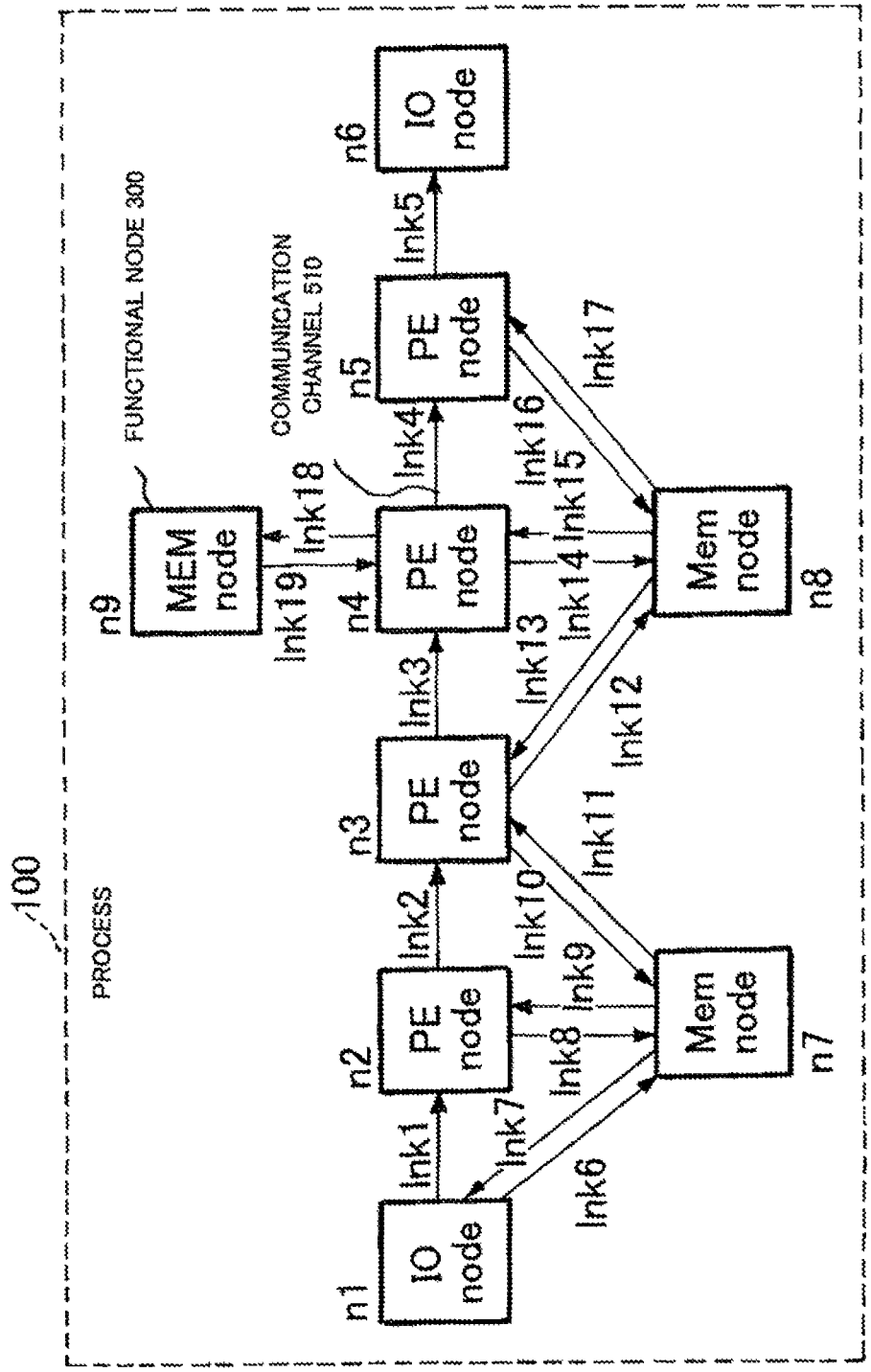
FIG. 2 A configuration diagram showing an example of a to-be-processed process of the present invention.

FIG. 2 shows an example of a process 100 and a functional node group assigned to form the process 100. The functional node group includes a plurality of functional nodes 300 and a communication channel 510, which is for communication between the functional nodes 300. The functional nodes are represented by n1 to n9 in FIG. 2. More specifically, input/output nodes are represented by n1 and n6, mathematical operation nodes by n2, n3, n4 and n5, and storage nodes by n7, n8 and n9.

The configuration of the communication channel 510 varies according to the processing that takes place in a process 100. If the process 100 is a general-purpose process such as OS, the functional nodes 300 may need to be linked together completely. If the process 100 is a process for performing specific processing, complete linking may not be required. In general, the communication channel 510, which is much less than complete linking, is sufficient. The present exemplary embodiment can handle the case where the communication channel between the functional nodes 300 makes a request for complete linking. In particular, the present exemplary embodiment is effective in making a request for a specific communication channel 510 that the process 100 requires.

The functional nodes 300, which make up the process 100, are identified by "local node ID," which is valid only inside the process 100. Similarly, the communication channels 510 are identified by "local communication channel ID," which is valid only inside the process 100.

In the case of FIG. 2, n1 to n9 are local node IDs; lnk1 to lnk19 are local communication channel IDs. The functional nodes 300 have "global node IDs" in addition to the above local node IDs. In this case, the global node IDs are IDs for identifying the functional nodes 300 in the parallel calculation system 1000. FIG. 1 shows global node IDs, N1 to Nn.

It is also possible to use a "global communication path ID," which is an ID for identifying a communication path between functional nodes 300, instead of the global node ID. The global communication path ID is not an ID corresponding to each network switch 400. A communication path for performing communication, which extends from a certain transferor functional node 300 to a certain transfer-destination functional node 300, can be specified as a connection state of a plurality of network switches 400, which make up the communication channel, and the network switch 400. The global communication path ID is an ID used for identifying the connection state.

The mapping 200 of processes to functional node groups can be achieved by managing the mapping of the local node IDs of the functional nodes 300, which make up the process 100, to the global node IDs.

The following describes the case when communication takes place between the functional nodes 300.

When communication takes place between the functional nodes 300, first the functional component 310 of the transferor functional node 300 creates a local communication request 600 using "local identification information" such as a local node ID or local communication channel ID. Then, the created local communication request 600 is transmitted to the functional node group management section 320 as a communication request to the transfer-destination functional node 300.

The functional node group management section 320 converts the local identification information of the received local communication request 600 into "global identification information," such as a global node ID or global communication channel ID, to create a global communication request 700.

The functional node group management section 320 then transmits the created global communication request 700 to the network switch 400, which makes up the communication path 500.

The network switch 400 controls the switch 420 on the basis of global identification information included in the global communication request 700. Therefore, the global communication request 700 is transferred to the transfer-destination functional node 300.

By performing the above operation, it is possible to realize communication between the functional nodes 300.

Here, the control of the switch 410 by the network switch 400 will be described in detail.

In the bandwidth management section 420 of the network switch 400, a communication channel and a bandwidth that is assigned to the communication channel are registered in advance. For example, the following are registered in the bandwidth management section 420: a transferor global node ID, and information about a bandwidth that is assigned to the communication channel corresponding to the transfer-destination global node ID. As another kind of registration information, information about a bandwidth that is assigned to the communication channel corresponding to a global communication channel ID may be registered. The network switch 400 controls the switch 410 on the basis of the global identification information that the global communication request 700 contains. However, at this time, in accordance with the bandwidth information that is registered in advance in the bandwidth management section 420 of the network switch 400, a required bandwidth is assigned, thereby guaranteeing the bandwidth that the communication request requires.

The following describes in detail the overall operation of the present exemplary embodiment shown in FIG. 1. In this case, without losing generality, the overall operation will be described using, as an example, the configuration of a parallel calculation system having a communication path 500 of a two-dimensional mesh structure.

Figure 3:
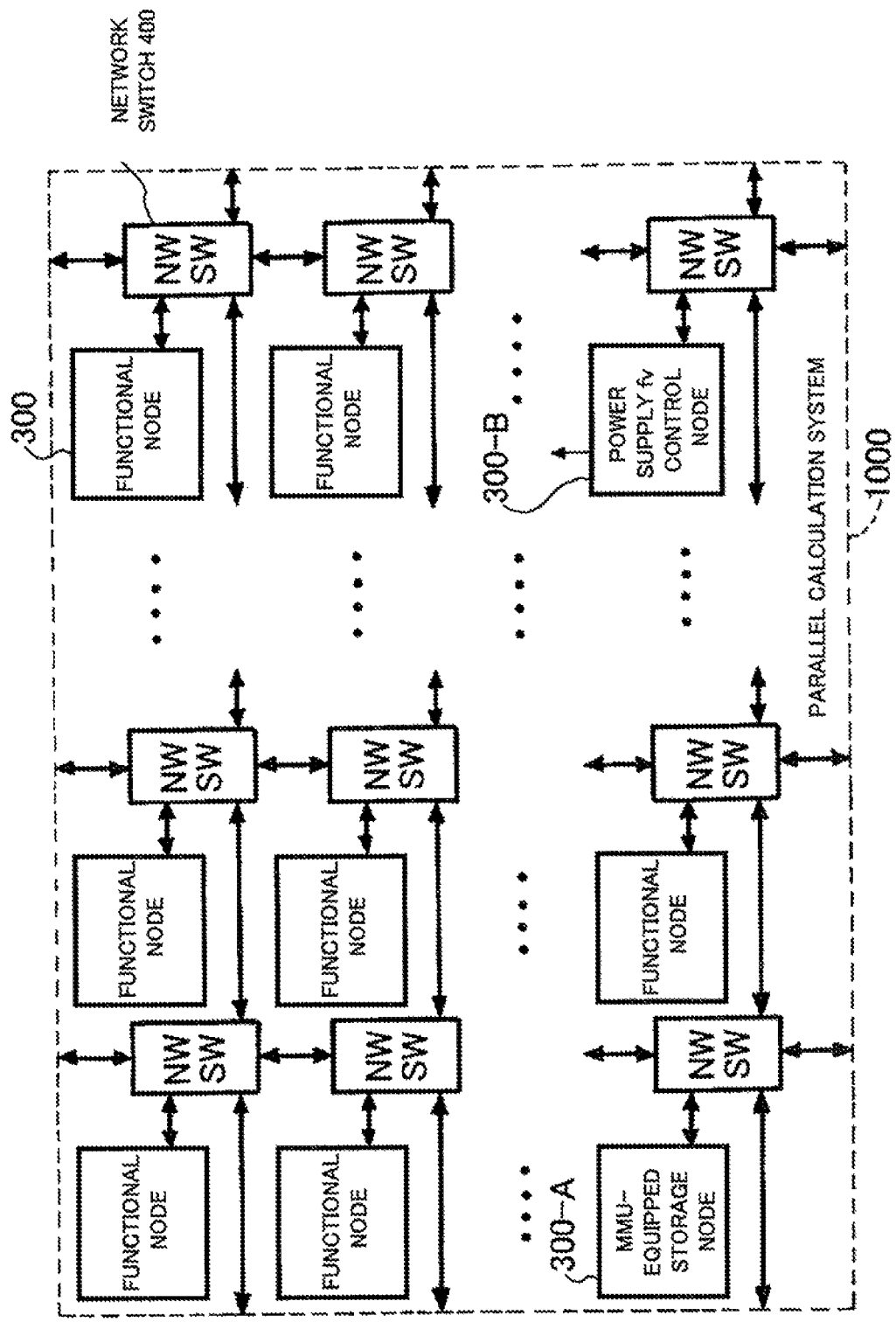
FIG. 3 A block diagram of a parallel calculation system of a two-dimensional mesh structure for explaining an operation of an exemplary embodiment of the present invention.

FIG. 3 shows an example of a parallel calculation system 1000 having a communication path 500 of a two-dimensional mesh structure according to the present exemplary embodiment. In the case of FIG. 3, the functional nodes 300 are arranged in a two-dimensional manner. One network switch 400 is connected for each functional node 300. Each network switch 400 is connected to four other adjacent network switches 400 in upper, lower, left and right areas on the two-dimensional array. The functional nodes 300 provide such functions as mathematical operations, input/output, storing or the like. Incidentally, the functional nodes 300 may include a storage node 300-A that is equipped with a MMU (Memory Management Unit), which is for sharing the storage function between a plurality of processes 100. Moreover, the functional nodes 300 may include a control node 300-B of power supply fv in order to control a power supply of the network switch 400, operating frequency and operating voltage.

Figure 4:
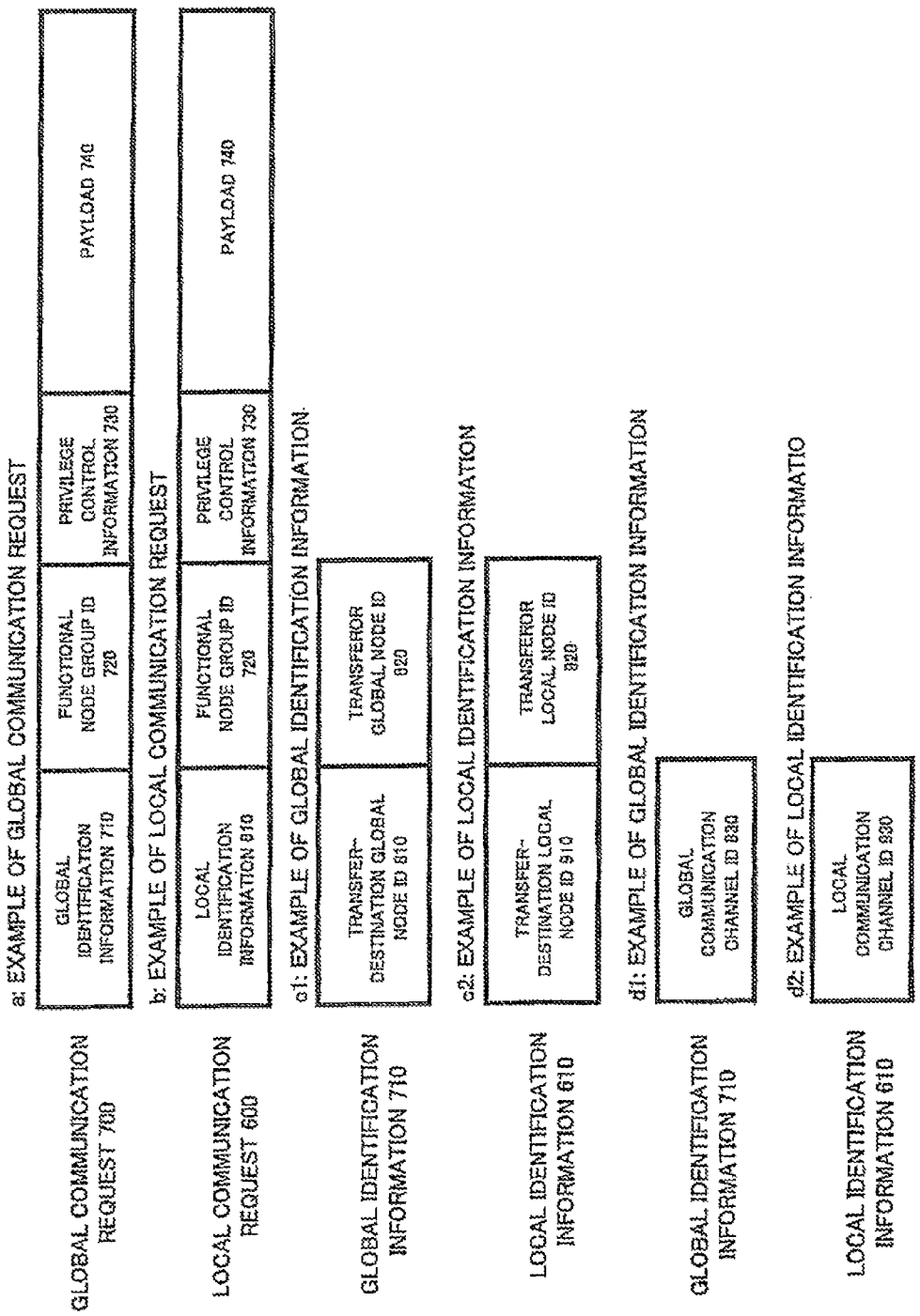
FIG. 4 A diagram showing an example of the configuration of a communication request for communication between functional nodes according to an exemplary embodiment of the present invention.

FIG. 4 is a diagram showing a specific example of data structures of identification information and a communication request, which is required to perform communication between the functional nodes 300.

FIG. 4a shows an example of the configuration of the global communication request 700, which includes global identification information 710 and a payload 740. The payload 740 is data transferred by communication. The global communication request 700 may be so formed as to further contain a functional node group ID 720 and privilege control information 730. In this case, the functional node group ID 720 is an ID for identifying a functional node group. The privilege control information 730 is information for carrying out privileged control or any other kind of communication control.

Moreover, the privilege control information 730 may hold information for controlling the transfer destination of the global communication request 700. For example, with the use of the privilege control information 730, the global communication request 700 may be transferred not only to the functional node 300 but also to the network switch 400. In the parallel calculation system 1000 shown in FIG. 3, one functional node 300 corresponds to one network switch 400. Accordingly, when the global communication request 700 is transferred to the network switch 400 corresponding to the functional node 300, the same global identification information 710 is set for the global communication request 700. Moreover, what is provided in the privilege control information 730 is a flag that identifies the functional node 300 or network switch 400 as a transfer destination. Therefore, it is possible to transfer the global communication request 700 in a way that distinguishes the one for the functional node 300 from the one for the network switch 400.

FIG. 4b shows an example of the configuration of the local communication request 600, which includes local identification information 610 and a payload 740. The local communication request 600 may be so formed as to contain a functional node group ID 720 and privilege control information 730, as in the case of the global communication request 700.

FIG. 4c1 shows an example of the configuration of the global identification information 710, which includes a transfer-destination global node ID 810 and a transferor global node ID 820.

FIG. 4c2 shows an example of the configuration of the local identification information 610, which includes a transfer-destination local node ID 910 and a transferor local node ID 920.

FIG. 4d1 shows another example of the configuration of the global identification information 710, which includes a global communication channel ID 830.

FIG. 4d2 shows another example of the configuration of the local identification information 610, which includes a local communication channel ID 930.

Figure 5:
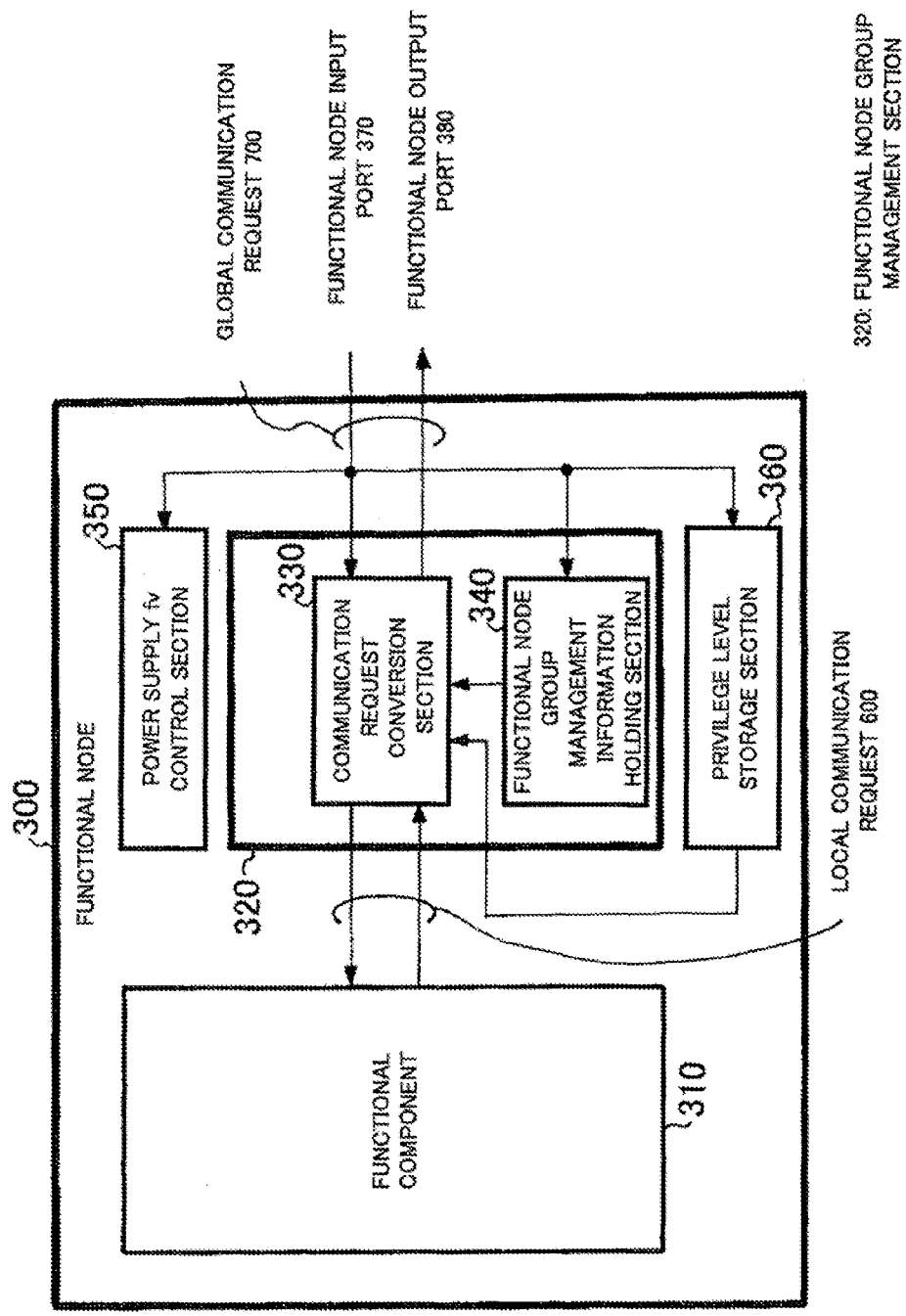
FIG. 5 A diagram showing an example of the configuration of a functional node according to an exemplary embodiment of the present invention.

FIG. 5 is a diagram showing an example of the configuration of the functional node 300. The functional node 300 includes a functional component 310, a functional node group management section 320, a power supply fv control section 350, a privilege level storage section 360, a functional node input port 370, and a functional node output port 380. Moreover, the functional node group management section 320 includes a communication request conversion section 330 and a functional node group management information holding section 340.

The functional component 310 provides one of the following functions: a mathematical operation function, an input/output function and a storage function. Instead of, or along with, the above functions, the functional component 310 may provide other functions.

The functional node group management section 320 functions as an interface section with the network switch 400.

The functional node 300 includes the functional node input port 370 and the functional node output port 380 in order to exchange the global communication request 700 with the network switch 400.

The functional node group management information holding section 340 holds information needed to convert the local communication request 600 to the global communication request 700, or the global communication request 700 to the local communication request 600. As a specific example of the information held by the functional node group management information holding section 340, there is a correspondence table of the local node IDs and global node IDs of a transfer-destination functional node 300 at a time when the functional node 300, as a transferor functional node 300, carries out communication.

Figure 12:
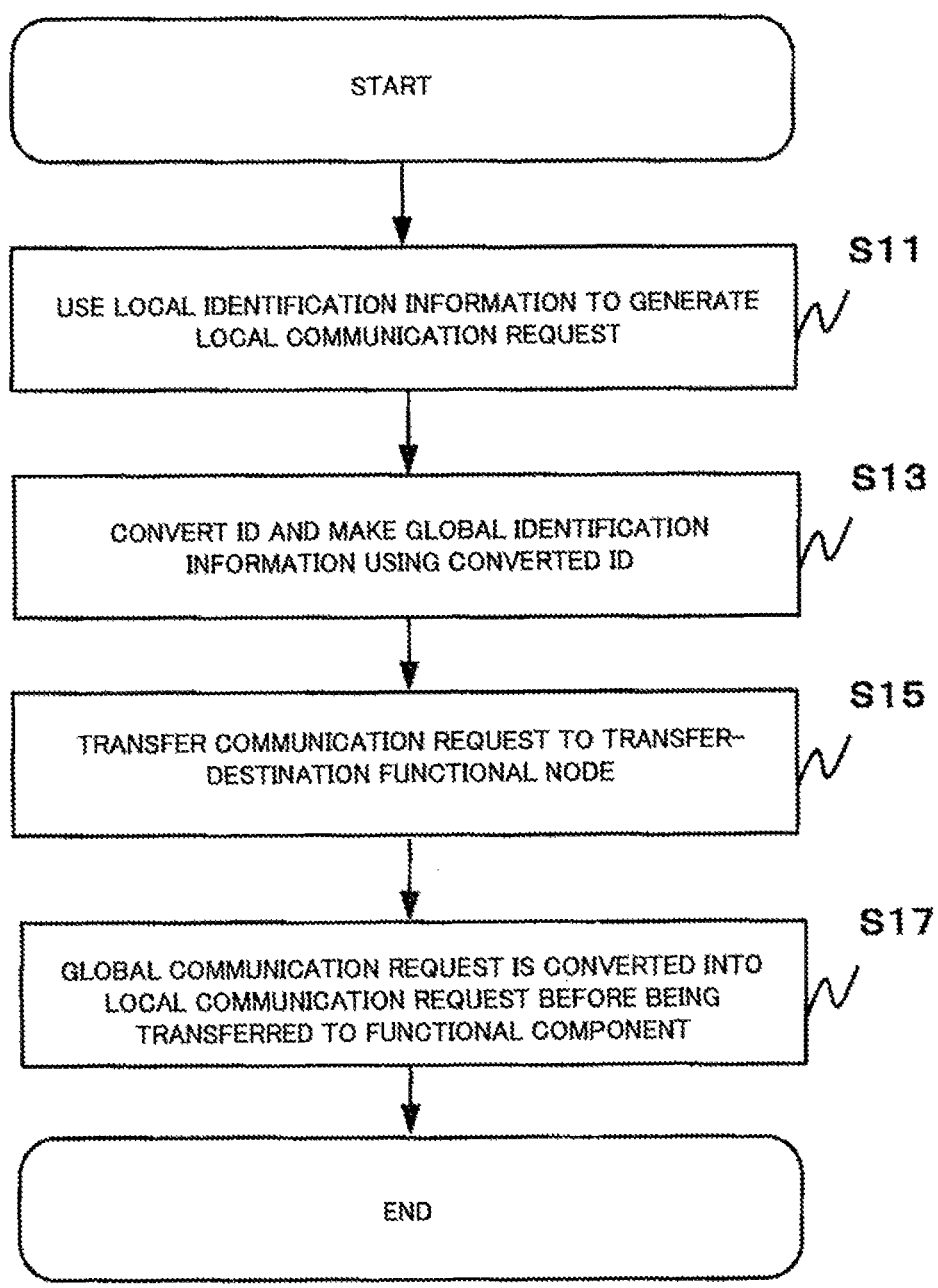
FIG. 12 A flowchart showing a basic operation of a functional node 300 according to an exemplary embodiment of the present invention.

With the use of a flowchart shown in FIG. 12, the following describes the case where the functional node 300 works as a transferor functional node 300.

The functional component 310 uses the local identification information 610, whose example is shown in FIG. 4c2, to generate a local communication request 600 (Step S11).

The communication request conversion section 330 looks up the functional node group management information holding section 340 to convert a transfer-destination local node ID 910, which is part of the local identification information 610 of the local communication request 600, into a global node ID 810. Similarly, the communication request conversion section 330 looks up the functional node group management information holding section 340 to convert a transferor local node ID 920 into a transferor global node ID 820. The communication request conversion section 330 then makes the global identification information 710 (see FIG. 4c1) using the converted IDs (Step S13).

The communication request conversion section 330 transmits the global communication request 700 containing the global identification information 710 shown in FIG. 4c1 to the network switch 400 from the functional node output port 380, thereby transferring the communication request to the transfer-destination functional node 300 (Step S15).

The following describes the case where the functional node 300 works as a transfer-destination functional node 300.

The global communication request 700, which is transferred from the network switch 400 to the functional node 300 via the functional node input port 370, is converted by the communication request conversion section 330 and the functional node group management information holding section 340 into a local communication request 600, which is then transferred to the functional component 310 (Step S17).

If it is not necessary for the functional component 310 to identify the transferor functional node 300 at the time of the above transferring process, the communication request conversion section 330 may take out the payload 740 from the global communication request 700 and transfer only the payload 740 to the functional component 310. In this case, the process of looking up the functional node group management information holding section 340 is unnecessary; it is possible to simplify the communication request conversion section 330 and the functional node group management information holding section 340.

Even when the global identification information 710 that the global communication request 700 contains, and the local identification information 610 of the local communication request 600 are formed using the global communication channel ID 830 (see FIG. 4d1) and the local communication channel ID 930 (see FIG. 4d2), respectively, it is possible to convert the local communication request 600 into the global communication request 700, or the global communication request 700 into the local communication request 600, in a similar manner.

Moreover, by rewriting and updating the functional node group management information holding section 340, it is possible to alter the configuration of a functional node group. The rewriting of the functional node group management information holding section 340 is performed with the use of the global communication request 700 from the other functional node 300. More specifically, with the use of the privilege control information 730 that the global communication request 700 contains and the payload 740, instructions are given about the rewriting of the functional node group management information holding section 340 as well as about how to rewrite. In that respect, a process 100 running in another functional node group could be affected if the functional node group management information holding section 340 is accidentally rewritten. Therefore, in order to prevent the functional node group management information holding section 340 from being rewritten accidentally or being rewritten by a malicious process 100, it is desirable that only the privileged global communication request 700 be rewritten. Accordingly, the privilege control information 730 is attached to the global communication request 700; in order to identify whether the communication request is the one that can request a privileged operation, the privilege control information 730 is used.

The privilege level storage section 360 of the functional node 300 keeps a privilege level of the functional node 300. Depending on the privilege level stored in the privilege level storage section 360, the communication request conversion section 330 controls the process of transmitting the global communication request 700, which demands a privileged operation. When the functional component 310 of the functional node 300 whose privilege level is low (Non-privilege level) has transmitted a local communication request 600 that demands a privileged operation, the communication request conversion section 330 converts the local communication request 600 into the global communication request 700 and blocks transmission to the network switch 400.

Even the rewriting of the privilege level kept by the privilege level storage section 360 is performed with the privileged global communication request 700. Meanwhile, with the global communication request 700 whose privilege level is low (or a non-privilege level), rewriting is blocked.

The power supply fv control section 350 of the functional node 300 switches the power supply of the functional node 300 ON/OFF and controls operating frequency and operating voltage. As the global communication request 700, it is possible to specify the control of the power supply fv of the functional node 300. With the use of the privilege control information 730, which is part of the global communication request 700, and the payload 740, it is possible to specify which of the following processes is to be performed: the process of switching the power supply ON/OFF, the process of controlling operating frequency, and the process of controlling operating voltage.

Figure 6:
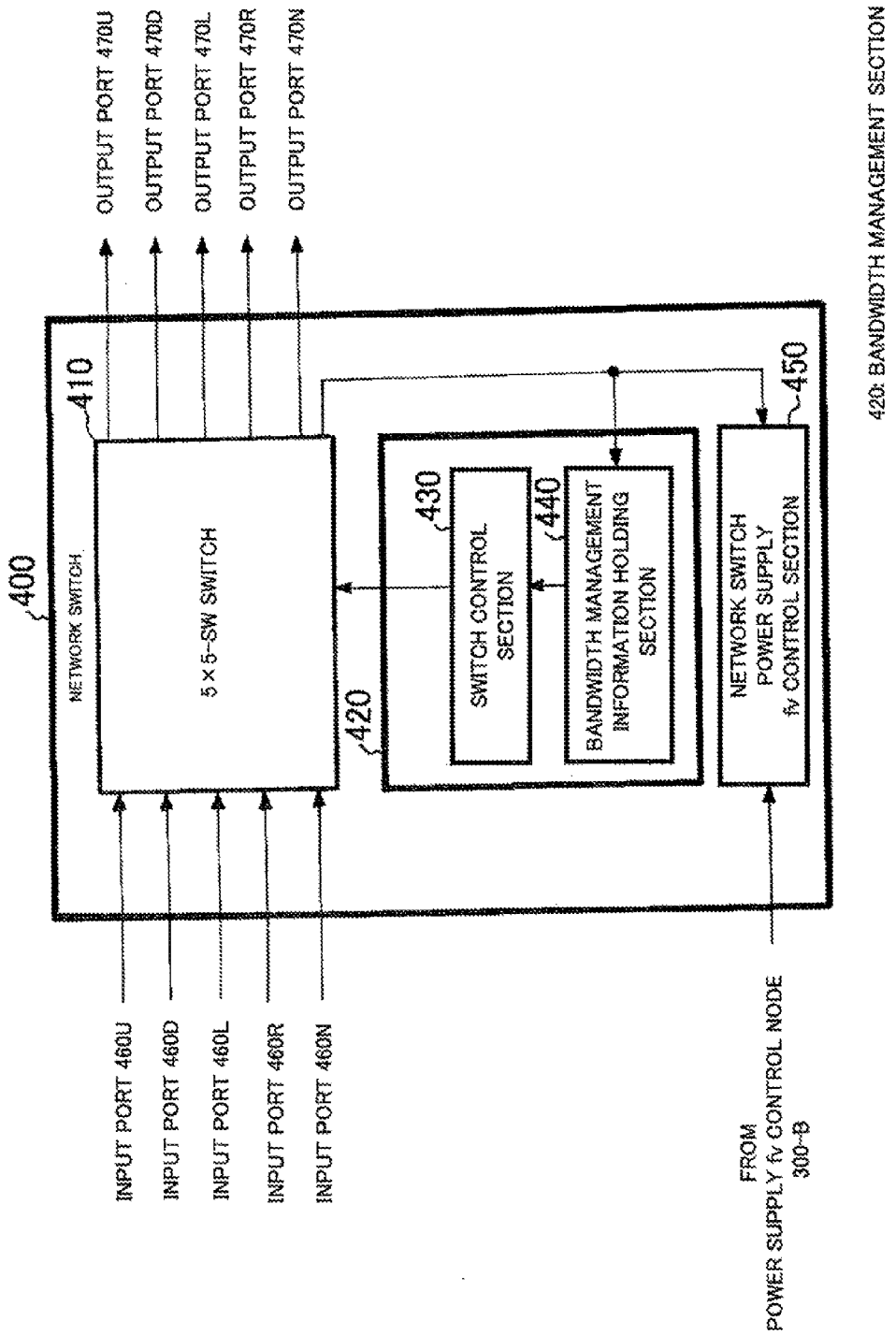
FIG. 6 A diagram showing an example of the configuration of a network switch according to an exemplary embodiment of the present invention.
Figure 13:
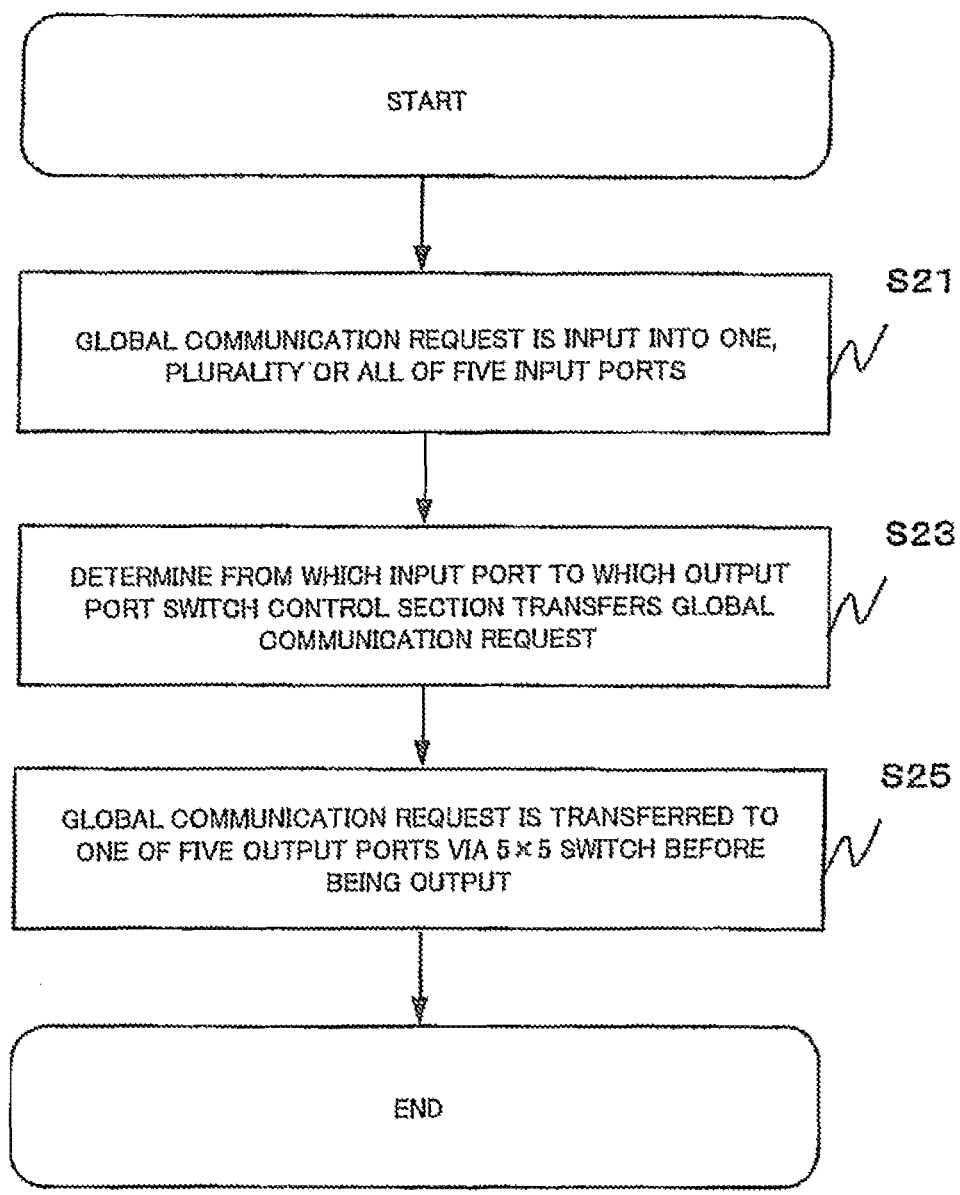
FIG. 13 A flowchart showing a basic operation of a functional network switch 400 according to an exemplary embodiment of the present invention.

The following describes the configuration of the network switch 400 with reference to FIG. 6, as well as the operation of the network switch 400 with reference to FIG. 13.

The network switch 400 includes a switch 410, a bandwidth management section 420, a switch control section 430, a bandwidth management information holding section 440, and a network switch power supply fv control section 450.

As described above with reference to FIG. 3, the network switch 400 has connections to the other, adjacent upper, lower, left and right network switches 400. The network switch 400 is also connected to one functional node 300. The network switch 400 has input/output ports for the above individual connections. Therefore, the network switch 400 has four network switches, i.e. the adjacent upper, lower, left and right network switches 400; and five input ports for inputs from one adjoining functional node 300. In FIG. 6 and the description below, the five input ports are represented by 460U, 460D, 460L, 460R and 460N. Similarly, there are four network switches 400, i.e. the adjacent upper, lower, left and right network switches 400, as well as five output ports for outputs to one adjacent functional node 300. In FIG. 6 and the description below, the five ports are represented by 470U, 470D, 470L, 470R, and 470N.

First, the global communication request 700 is input into one or a plurality of or all of the five input ports 460U, 460D, 460L, 460R and 460N (Step S21).

Then, the switch control section 430 of the bandwidth management section 420 determines from which input port 460 the global communication request 700 is transferred to which output port 470 (Step S23).

The switch control section 430 controls the switch 410 in such a way that the global communication requests 700 from the five input ports 460U, 460D, 460L, 460R and 460N are transferred to any of the five output ports 470U, 470D, 470L, 470R and 470N via the 5×5 switch 410 and then output (Step S25). A destination to which the global communication request is transferred is not limited to one; there may be a plurality of transfer destinations. For example, there is a plurality of transfer destinations when the same communication request is transferred to the entire node group, i.e. all nodes belonging to a node group or when the same communication request is transferred to some of the nodes belonging to a node group.

The switch 410 is controlled by the switch control section 430 of the bandwidth management section 420 in terms of from which input port 460 the global communication request 700 is transferred to which output port 470. For each global communication request 700, a bandwidth required for transferring is set. As for a plurality of communication channels 510 that pass through the network switch 400, the bandwidth management information holding section 440 stores information that is used to control the switch 410. A specific example of the information used to control the switch 410 is a table on which transfer-destination output ports 470 are linked to required bandwidths for each of the communication channels 510 identified by the global identification information 710 that the global communication request 700 contains. The switch control section 430 controls the switch 410 on the basis of the bandwidth management information holding section 440. The bandwidth management information holding section 440 can be rewritten as instructed by the global communication request 700, which has been transferred to the network switch 400.

Figure 7:
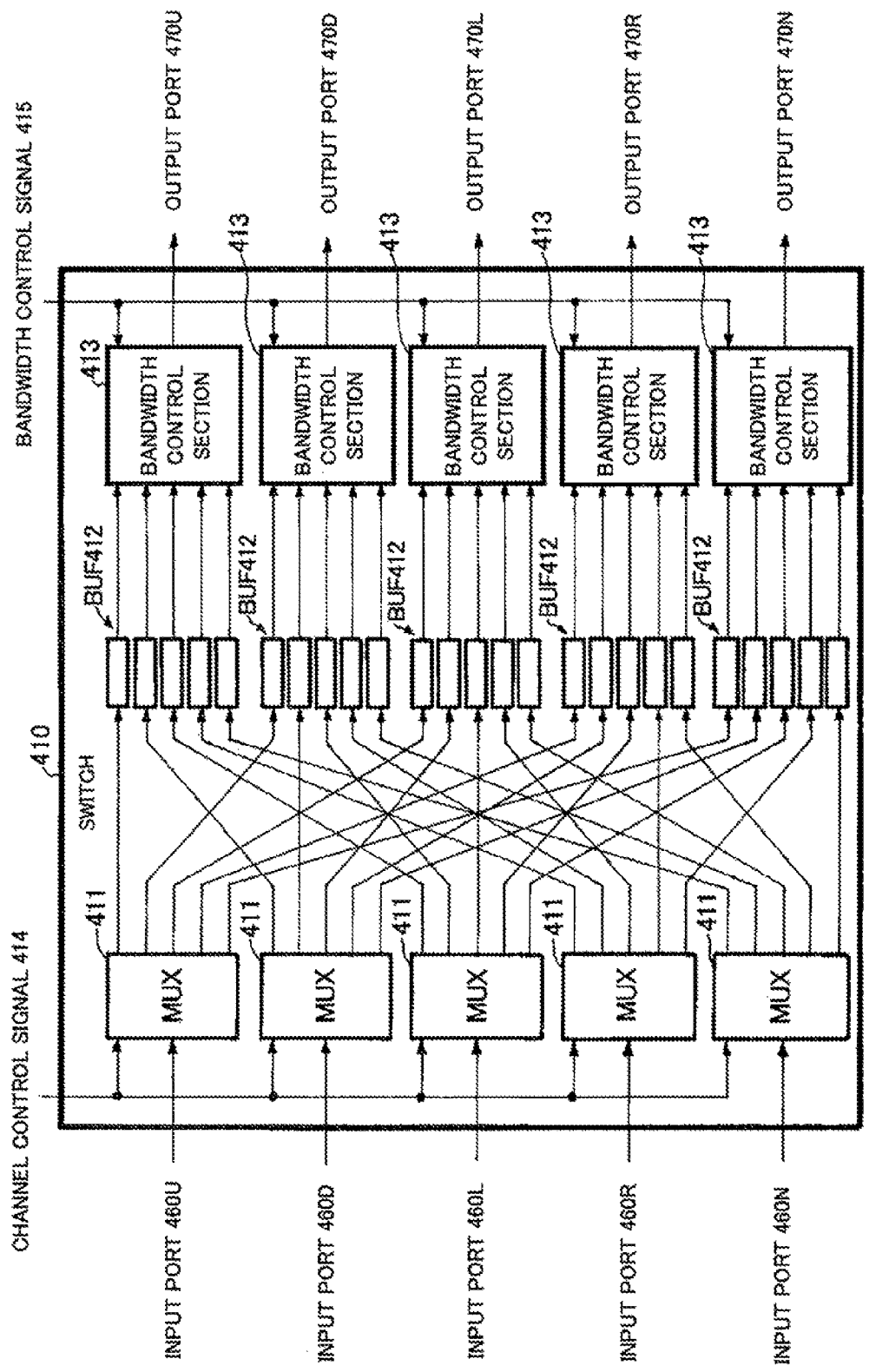
FIG. 7 A diagram showing an example of the configuration of a switch that makes up a network switch according to an exemplary embodiment of the present invention.

FIG. 7 shows an example of the configuration of the 5×5 switch 410. In FIG. 7, for ease of explanation, a transfer channel to the network switch 400 is not shown. However, the transfer channel to the network switch 400 can be easily added by increasing the number of output ports to six from five.

A transfer operation of the switch 410 is specified by channel control signal 414 and bandwidth control signal 415, which make up a control signal from the switch control section 430 shown in FIG. 6.

A multiplexer (Multiplexer; referred to as "MUX" in the diagrams and the description below) MUX 411 carries out channel control in order to appropriately transfer the global communication request 700 received from the input port 460 to the output ports 470. A bandwidth control section 413 carries out control for transferring in such a way that a bandwidth required for the global communication request 700 is guaranteed. A buffer (Buffer; referred to as "BUF" in the diagrams and the description below) BUF 412 is a BUF for accumulating the global communication requests 700 between the MUX 411 and the bandwidth control section 413.

For the MUX 411, an appropriate output destination is set in advance for each communication channel 510 on the basis of the channel control signal 414. The MUX 411 identifies a communication channel 510 on the basis of the global identification information 710 that the global communication request 700 contains; and transfers the global communication request 700 to the output-destination BUF 412, which is set in advance.

Figure 8:
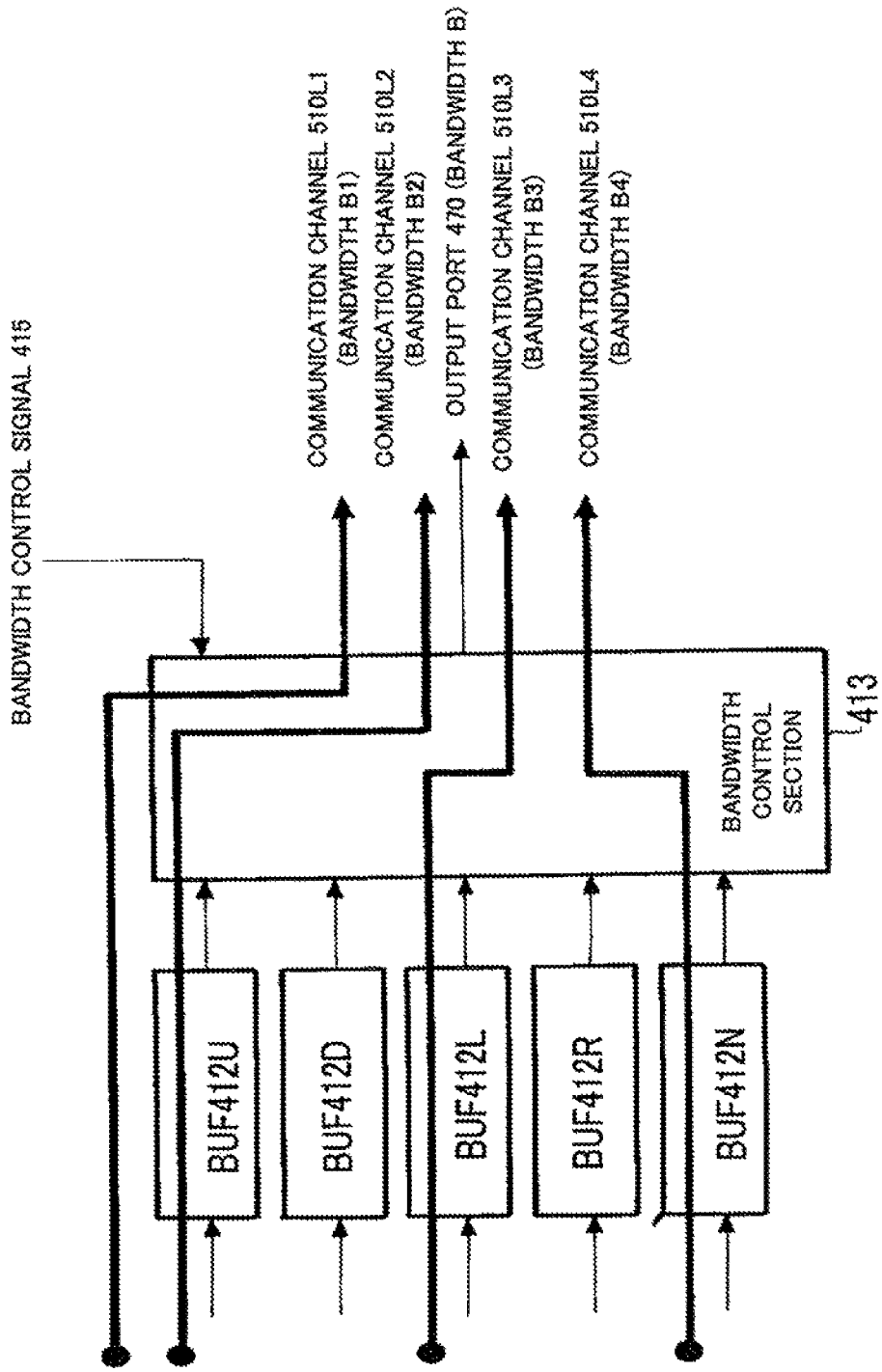
FIG. 8 A diagram illustrating bandwidth control by a network switch according to an exemplary embodiment of the present invention.

FIG. 8 is a diagram showing an example of bandwidth control. In the case of FIG. 8, the output port 470 is shared by the four communication channels, 510L1, 510L2, 510L3 and 510L4. When the bandwidth of the output port 470 is represented by B and when the bandwidths required for the four communication channels 510L1, 510L2, 510L3 and 510L4 are represented by B1, B2, B3 and B4, respectively, then the following relation needs to be true.

[Formula 1]

$$B > B1 + B2 + B3 + B4 \quad \text{Formula 1}$$

The channel from the BUF 412U to the output port 470 is shared by two communication channels 510L1 and 510L2. The bandwidth required for the channel is (B1+B2). For the channels from the BUF 412D and BUF 412R to the output ports 470, no communication channel 510 is set. For the channel from the BUF 412L to the output port 470, the communication channel 510L3 is set. For the channel from the BUF 412N to the output port 470, the communication channel 510L4 is set.

The bandwidth management sections 413 set bandwidths of B1+B2, 0, B3, 0 and B4 for four BUFs, 412U, 412D, 412L, 412R and 412N, respectively.

The BUF 412U is shared by the two communication channels 510L1 and 510L2. However, if the sender functional node 300 of each transmits the global communication request 700 that is within a preset bandwidth range, the bandwidth (B1+B2) is guaranteed for the BUF 412U without distinguishing between the communication channels.

If the length of the global communication request 700 is fixed, the bandwidth control section 413 checks whether there is a global communication request 700 in each BUF 412, for example, in a round-robin fashion. If there is a global communication request 700, one global communication request 700 is taken out from the BUF 412 and transferred to an output port 470. Since the bandwidths assigned to the BUFs 412 are different from each other, round-robin is carried out at a rate proportional to the assigned bandwidth. Therefore, communication takes place in a way that guarantees the bandwidth required for each communication channel 510. In the example shown in FIG. 8, for the five BUFs, 412U, 412D, 412L, 412R and 412N, round-robin can take place at a rate proportional to the following.

[Formula 2]

$$B1+B2:0:B3:0:B4 \quad \text{Formula 2}$$

The rate at which round-robin takes place is set by the bandwidth control signal 415.

Meanwhile, if the length of the global communication request 700 is not fixed, round-robin takes place so that the maximum length of the global communication request 700 is set and the communication of the maximum length is guaranteed. If round-robin is performed as described above and if the difference between the maximum length and the average length of the global communication request 700 is large, a portion that does not reach the maximum length turns out to be useless. Therefore, if the maximum length of the global communication request 700 is represented by Lmax and the length of the to-be-transferred global communication request 700 by L, a clock of the bandwidth control section 413 is stopped for a period of time required for transferring (Lmax-L) in order to prevent power from being consumed wastefully.

The network switch 400 shown in FIG. 6 further includes the network switch power supply fv control section 450.

The network switch power supply fv control section 450 turns the power supply ON/OFF and controls operating voltage and operating frequency in response to instructions of the global communication request 700, which has been transferred to the network switch 400.

It is also possible to turn the power supply ON/OFF and control operating voltage and operating frequency in response to instructions that pass through an exclusive communication path from the power supply fv control node 300-B shown in FIG. 3 instead of instructions of the global communication request 700.

Figure 9:
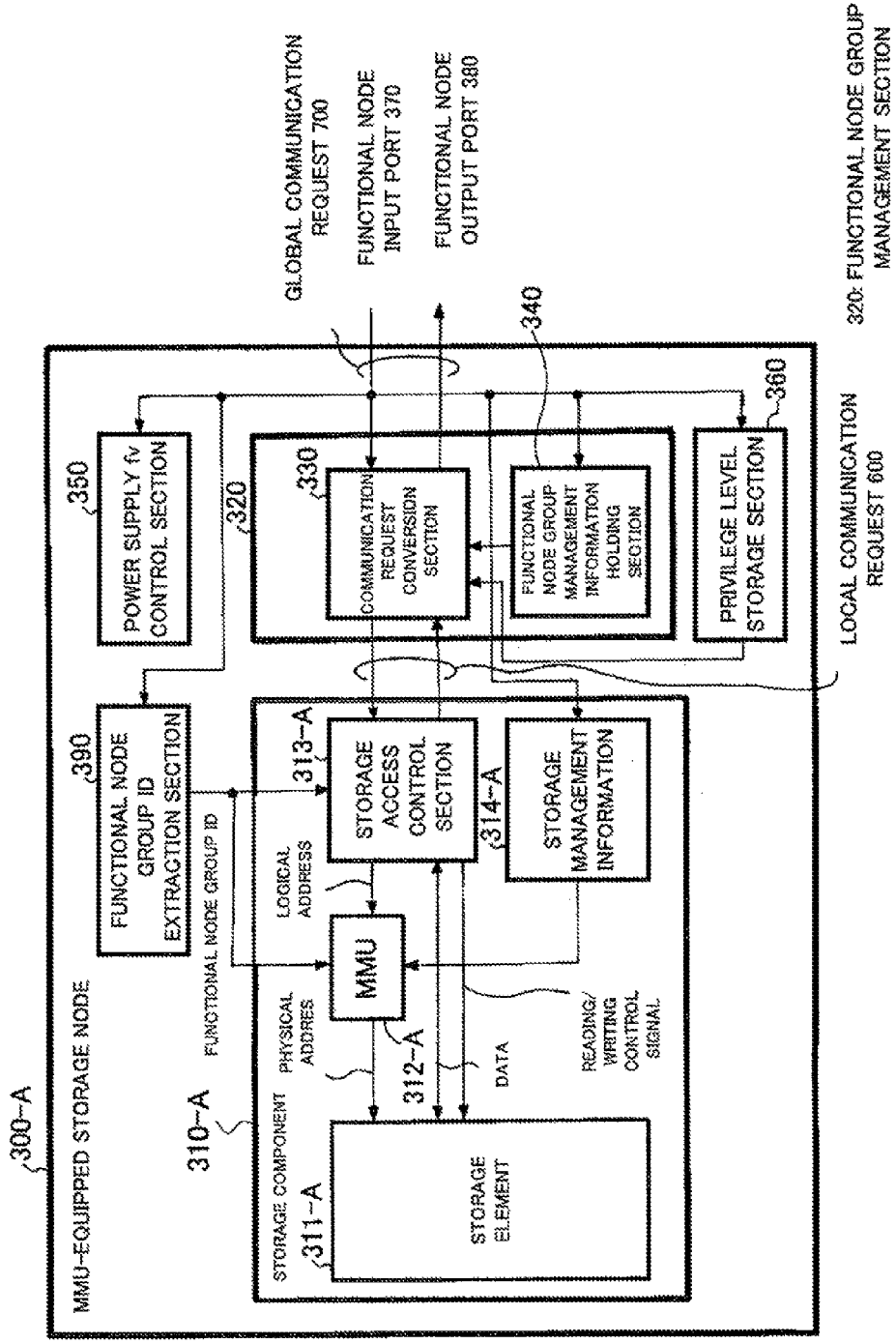
FIG. 9 A diagram showing an example of the configuration of a MMU-equipped storage node according to an exemplary embodiment of the present invention.

FIG. 9 shows an example of the configuration of a MMU-equipped storage node 300-A. Like the functional node 300 shown in FIG. 5, the MMU-equipped storage node 300-A includes the functional node group management section 320, the communication request conversion section 330, the functional node group management information holding section 340, the power supply fv control section 350, and the privilege level storage section 360. In addition, the MMU-equipped storage node 300-A includes a functional node group ID extraction section 390, as well as a storage component 310-A as a functional component 310. Moreover, the storage component 310-A includes a storage element 311-A, a MMU 312-A, a storage access control section 313-A and storage management information 314-A.

The functional node group ID extraction section 390 extracts a functional node group ID from the global communication request 700. The storage component 310-A functions as a MMU-equipped storage component.

The global communication request 700 received from the functional node input port 370 is converted into a local communication request 600, which is then transferred to the storage access control section 313-A. The payload 740 of the local communication request 600 is an instruction for access to the storage element. More specifically, the payload 740 of the local communication request 600 includes an access type, which indicates whether access is for writing or reading, and a logical address. When the access type indicates writing, the payload 740 further contains data to be written. Meanwhile, when the access type indicates reading, the payload 740 contains a local node ID of a functional node 300 to which the data that have been read is to be transferred.

The storage access control section 313-A extracts the access type and the logical address from the local communication request 600. If the access type indicates writing, the storage access control section 313-A also extracts data. If the access type indicates reading, the storage access control section 313-A also extracts a local node ID of a functional node 300 to which the data that have been read is to be transferred. The storage access control section 313-A performs a reading/writing operation for the storage element on the basis of the extracted information.

The storage management information 314-A keeps a functional node group, which accesses the MMU-equipped storage node 300-A; a logical access, which is unique in each functional node group; and information needed to convert a physical address of the storage element 311-A.

The MMU 312-A converts a logical address into a physical address. A request for access to the MMU-equipped storage node 300-A is transferred from a plurality of functional node groups as a global communication request 700. The MMU 312-A converts a logical address into a physical address on the basis of the functional node group ID, which is extracted by the functional node group ID extraction section 390, and the storage management information 314-A.

The global communication request 700 received from the functional node input port 370 is converted by the functional node group management section 320 into a local communication request 600, which is then transferred to the storage access control section 313-A.

The storage access control section 313-A performs access control for the storage element 311-A in accordance with the access type. The logical address is converted by the MMU 312-A into a physical address, which is then used for specifying an address of the storage element 311-A. When the access type indicates writing, the storage access control section 313-A writes the extracted data into the storage element 311-A. When the access type indicates reading, a local communication request 600 is generated from the data read from the storage element 311-A, the local node ID of the functional node 300 to which the data is to be transferred, and the functional node group ID extracted by the functional node group ID extraction section 390. Then, the generated local communication request 600 is transferred to the communication request conversion section 330.

The communication request conversion section 330 converts the local communication request 600 into a global communication request 700 and transmits the global communication request 700 to the functional node output port 380.

Incidentally, the rewriting of the storage management information 314-A can be performed by a privileged global communication request 700 from the functional node input port 370.

Figure 10:
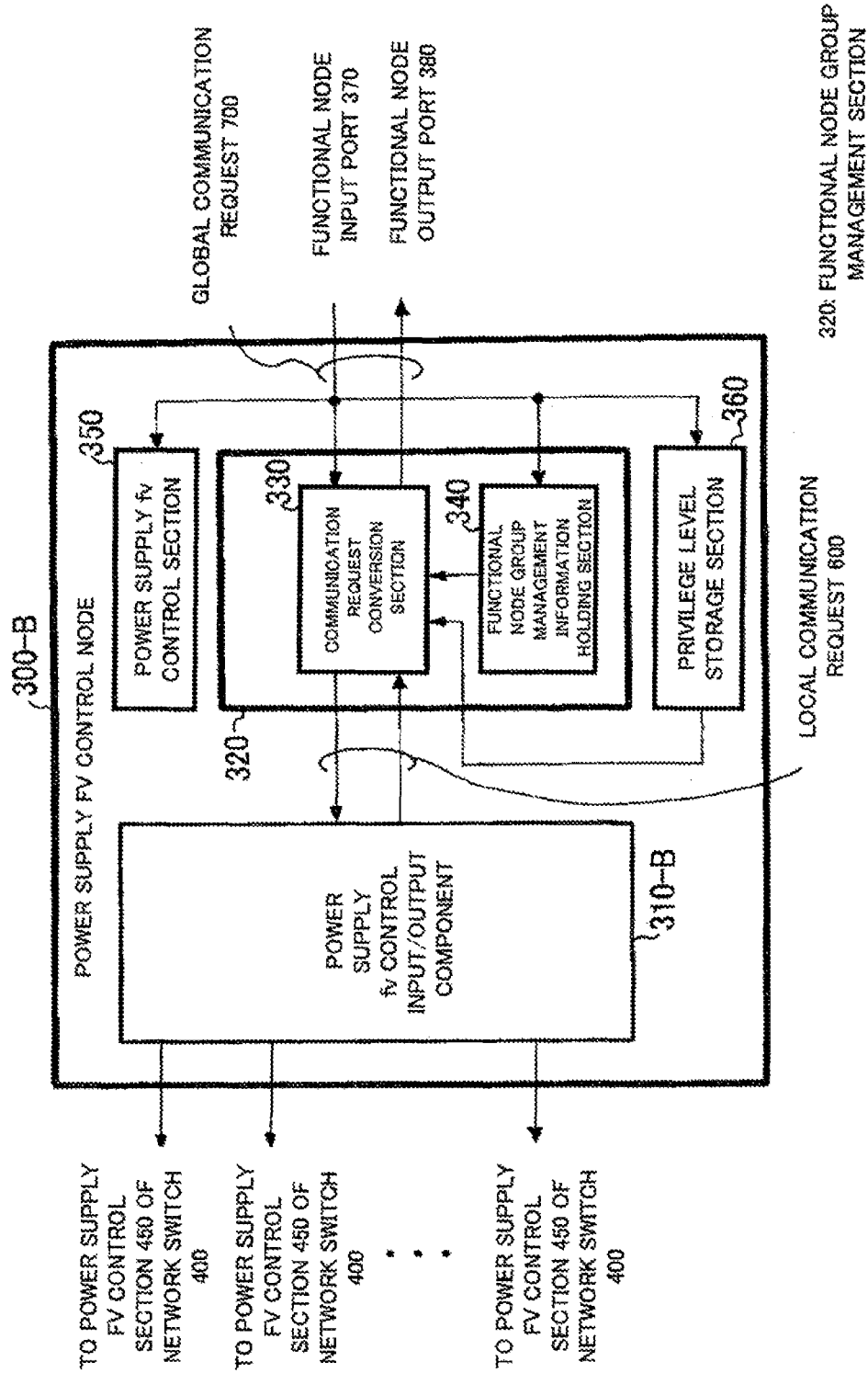
FIG. 10 A diagram showing an example of the configuration of a power supply fv control node according to an exemplary embodiment of the present invention.
Figure 11:
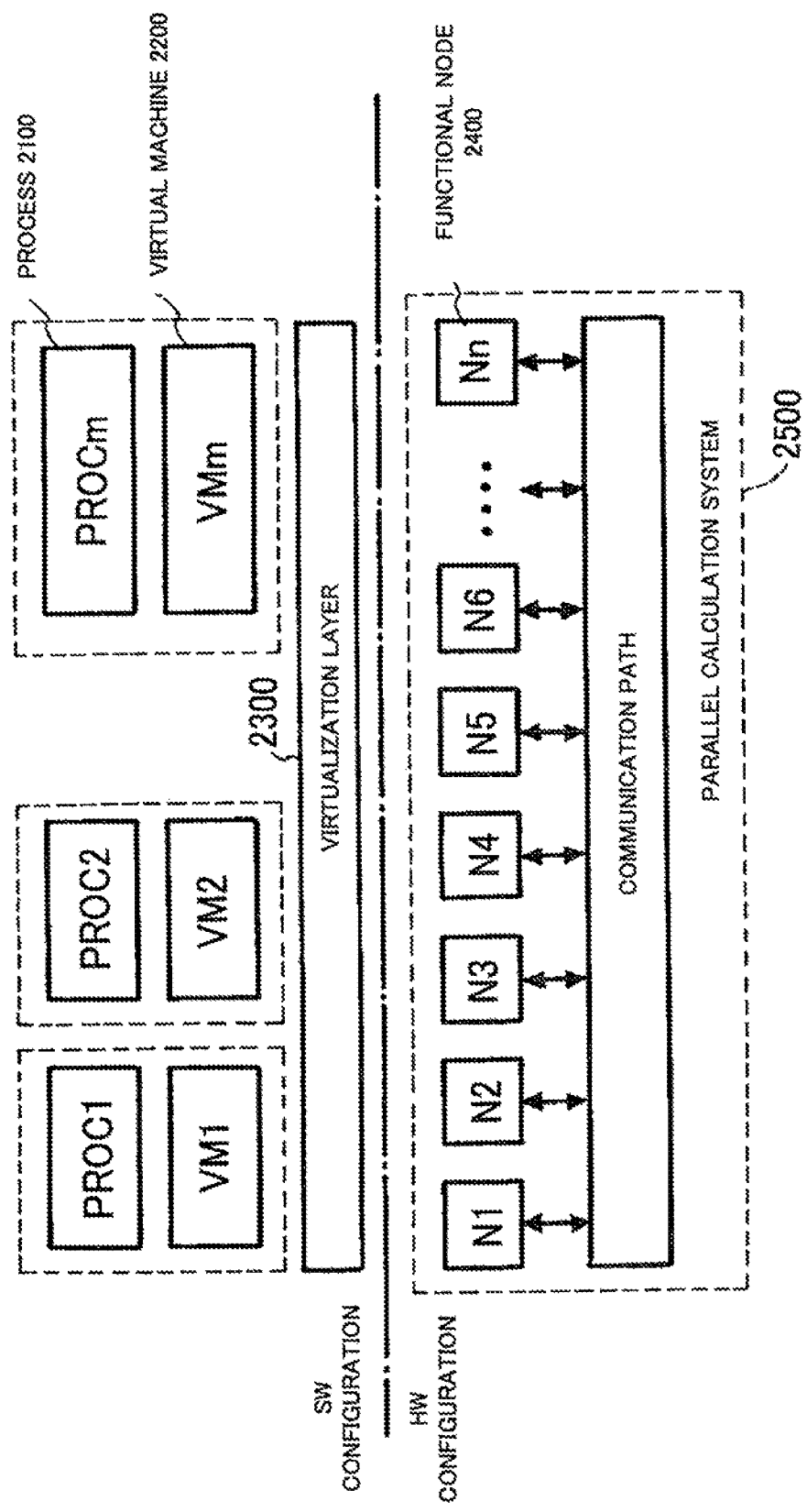
FIG. 11 A block diagram illustrating a virtual cluster technique pertaining to the present invention.

FIG. 10 shows an example of the configuration of the power supply fv control node 300-B. The power supply fv control node 300-B switches the power supply of the network switch 400 ON/OFF and controls operating voltage and operating frequency via an exclusive communication path.

As in the case of the functional node 300 shown in FIG. 5, the power supply fv control node 300-B includes the functional node group management section 320, the communication request conversion section 330, the functional node group management information holding section 340, the power supply fv control section 350, and the privilege level storage section 360. Moreover, the power supply fv control node 300-B includes a power supply fv control input/output component 310-B as a functional component 310.

The power supply fv control input/output component 310-B controls the power supply fv of the network switch 400 via an exclusive communication path connected to the power supply fv control section 450 of the network switch 400 in response to instructions of the payload 740 that the global communication request 700 from the functional node input port 370 contains.

The following describes advantages of the present exemplary embodiment described above.

The first advantage is that it is possible to reduce the overhead of communication between functional nodes that make up a process. The reason is that direct communication between functional nodes is possible because of the functional node group management section without an OS or virtualization layer being put therebetween.

The second advantage is that a bandwidth for communication between functional nodes assigned to a process can be guaranteed. The reason is that the bandwidth management section of the network switch can control communication in accordance with the bandwidth of communication between preset functional nodes.

The third advantage is that it is possible to run a plurality of processes on one parallel processing system without the processes interfering with each other. The reason is that functional nodes assigned by the functional node group management section or bandwidth management section to each process, as well as a communication bandwidth between the functional nodes, work completely separately from other processes.

The fourth advantage is that it is possible to reduce power consumption. The reason is that since each functional node 300 is formed so as to include a power supply fv control section 350, it is possible to reduce power consumption by turning off the power supply of a functional node 300 that is not assigned to a process or stopping the clock. Moreover, if the functional node 300 has extra processing power, it is possible to reduce power consumption by lowering clock frequency or power-supply voltage.

Moreover, each network switch 400 is so formed as to include a network switch power supply fv control section 450. Therefore, it is possible to reduce power consumption by turning off the power supply of a network switch 400 to which no communication channel 510 is assigned or stopping the clock. If the bandwidth of the network switch 400 is not fully occupied compared with the required bandwidth of the communication channel 510 assigned to the network switch 400, it is possible to reduce power consumption by lowering clock frequency or power-supply voltage.

The fifth advantage is that it is possible to set in such a way that the manipulation of the management information is performed only by a process 100 whose privilege level is high. The reason is that since the global communication request 700 and local communication request 600 of the present exemplary embodiment can be formed so as to include the privilege control information 730, it is possible to set in such a way that only a process 100 whose privilege level is high can manipulate management information of the functional node group management information holding section 340, the privilege level storage section 360, the power supply fv control section 350, the network switch power supply fv control section 450, the storage management information 314-A and the like. Therefore, it is possible to form an OS process that assigns a functional node 300 or resources, such as communication channels 510, to other processes 100 or performs any other process.

The sixth advantage is that communication between different processes 100 is also possible. The reason is that it is possible to have the MMU-equipped storage node 300-A as a storage node, and it is possible to safely realize a shared memory function by which the MMU-equipped storage node 300-A shares the same storage element 311-A between a plurality of processes 100.

Incidentally, the parallel calculation system of the exemplary embodiment of the present invention can be realized by hardware, software or a combination of both.

For example, the above parallel calculation system can be realized by hardware. However, the parallel calculation system can also be realized by a computer that reads a program, which causes the computer to function as the system, from a recording medium to execute the program.

Moreover, the above parallel calculation method can be realized by hardware. However, the parallel calculation method can also be realized by a computer that reads a program, which causes the computer to carry out the method, from a computer-readable recording medium to execute the program.

The above hardware and software configuration is not limited to a specific one. As long as the above-described function of each section can be realized, any kind of configuration can be applied. For example, each component may be formed for each of the above-described functions of each section, or alternatively the functions of each section may be formed integrally.

The above has described the present invention with reference to the exemplary embodiment. However, the present invention is not limited to the above exemplary embodiment. Various modifications apparent to those skilled in the art may be made on the configuration and details of the present invention without departing from the scope of the present invention.

INDUSTRIAL APPLICABILITY

The present invention can be applied to built-in control of a multi-core system whose real-time and low-power performance is important. Moreover, the present invention can be applied to the case where each of a plurality of processes is optimized by an automatic parallelizing compiler on a per-process basis for multiple cores and is executed on one parallel calculation system without the processes interfering with each other.

REFERENCE SIGNS LIST

100, 2100: Process
200, 2200: Virtual machine for mapping of processes to functional node groups
300, 2400: Functional node
300-A: MMU-equipped storage node
300-B: Power supply fv control node
310: Functional component
310-A: Storage component
311-A: Storage element
312-A: MMU
313-A: Storage access control section
314-A: Storage management information
310-B: Power supply fv control input/output component
320: Functional node group management section
330: Communication request conversion section
340: Functional node group management information holding section
350: Power supply fv control section
360: Privilege level storage section
370: Functional node input port
380: Functional node output port
390: Functional node group ID extraction section
400: Network switch
410: Switch
411: MUX
412, 412U, 412D, 412L, 412R, 412N: BUF
413: Bandwidth control section
414: Channel control signal
415: Bandwidth control signal
420: Bandwidth management section
430: Switch control section
440: Bandwidth management information holding section
450: Network switch power supply fv control section
460, 460U, 460D, 460L, 460R, 460N: Input port
470, 470U, 470D, 470L, 470R, 470N: Output port
500: Communication path
510, 510L1, 510L2, 510L3, 510L4: Communication channel
600: Local communication request
610: Local identification information
700: Global communication request
710: Global identification information
720: Functional node group ID
730: Privilege control information
740: Payload
810: Transfer-destination global node ID
820: Transferor global node ID
830: Global communication channel ID
910: Transfer-destination local node ID
920: Transferor local node ID
930: Local communication channel ID
1000, 2500: Parallel calculation system
2300: Virtualization layer

The invention claimed is:
1. A parallel calculation system comprising:
a plurality of functional nodes having a mathematical operation function, an input/output function or a storage function, or a combination of the functions, for carrying out information processing; and
a plurality of network switches, which serve as part of a communication path for communication between the functional nodes and function as communication channels, wherein
the parallel calculation system executes a plurality of processes, the functional nodes include:
a functional component having a mathematical operation function, an input/output function or a storage function, or a combination of the functions, for carrying out information processing;
a functional node input/output port that is a port for inputting and outputting a communication request transferred between the functional nodes for interactive communication between the functional nodes; and
a functional node group management unit that manages, as one group, a functional node group made up of part or all of a plurality of the functional nodes that the parallel calculation system includes, the functional node group being assigned to one of the plurality of processes, and
the network switches include:
a plurality of input/output ports that are ports for inputting and outputting the communication request;
a switch that outputs the communication request that the input/output port inputs to the input/output port; and
a bandwidth management unit that manages a communication bandwidth for each of the communication channels between the functional nodes belonging to the functional node group and controls the switch, wherein
a local communication request, which is a communication request for carrying out interactive communication only between a plurality of the functional nodes that make up the functional node group, is used for communication between a plurality of the functional nodes that make up the functional node group;
a global communication request, which carries out interactive communication between all the functional nodes that make up parallel calculation system, is used for communication on the communication path; and
the functional node group management unit includes
a functional node management information holding unit that manages information used in converting the local communication request into the global communication request or the global communication request into the local communication request, and
a communication request conversion unit that uses the information managed by the functional node management information holding unit to convert the local communication request, which the functional component inputs or outputs, into the global communication request, which the functional node input/output port inputs or outputs, or the global communication request into the local communication request.

2. The parallel calculation system according to claim 1, wherein
the functional nodes further include a power supply fv control unit that performs a process of controlling the turning on and off of the power supply of the functional nodes, a process of controlling operating frequency of the functional nodes, or a process of controlling operating voltage of the functional nodes, or a combination of the processes.

3. The parallel calculation system according to claim 1, wherein:
the local communication request and the global communication request include privilege control information, which is information indicating whether the local communication request or global communication request is a privileged communication request; and
the functional nodes further include a privilege level storage unit that keeps a upper limit value of a privilege level of the privilege control information of the global communication request that the functional nodes can transmit from the functional node input/output port.

4. The parallel calculation system according to claim 1, wherein
the bandwidth management unit further includes:
a bandwidth management information holding unit that keeps the mapping of the communication channels, which include the network switch as part of the communication channels, to communication bandwidths assigned to the communication channels; and
a switch control unit that controls the switch of the network switch in accordance with the bandwidth management information.

5. The parallel calculation system according to claim 1, wherein
the network switches include:
a plurality of input ports and output ports corresponding to the input/output ports of the network switches;
a multiplexer that controls the communication channel for each of a plurality of the input ports and has outputs corresponding to a plurality of the output ports;
a buffer in which global communication requests accumulate for each of the outputs of the multiplexer; and
a bandwidth control unit that outputs to the output ports the global communication requests that are accumulated in a plurality of the buffers whose output destination is the output port of each of a plurality of the multiplexers.

6. The parallel calculation system according to claim 5, wherein
the bandwidth control unit carries out a process for a plurality of the buffers, by which the global communication request is received by the bandwidth control unit, at a rate proportional to a communication bandwidth assigned to each of the communication channels in a round-robin fashion.

7. The parallel calculation system according to claim 1, wherein
the network switches further include a network switch power supply fv control unit that performs a process of controlling the turning on and off of the power supply of the network switch, a process of controlling operating frequency of the network switch, or a process of controlling operating voltage of the network switch, or a combination of the processes.

8. The parallel calculation system according to claim 7, wherein
the functional node includes a power supply fv control node that controls a plurality of the network switch power supply fv control unit that make up the communication path through an exclusive communication path.

9. The parallel calculation system according to claim 1, wherein,
the functional node includes a MMU (Memory Management Unit)-equipped storage node that allows shared access from a plurality of the functional node groups and enables a storage function to be shared.

10. The parallel calculation system according to claim 9, wherein
in addition to the functional node group management unit, the privilege level storage unit, the power supply fv control unit and the functional node input/output port, the MMU-equipped storage node includes:
a functional node group ID extraction unit that extracts a functional node group ID from the global communication request input from the functional node input/output port;

a storage element for reading and writing data using a physical address and a reading/writing control signal;

a storage access control unit that extracts access control information for the storage element from the local communication request that the functional node group management unit creates by converting the global communication request, and controls the reading and writing of data for the storage element using a logical address of the extracted access control information;

a storage management information holding unit that holds the logical address for each of the functional node groups and conversion information of a physical address for accessing the storage element; and a MMU that converts a logical address output from the storage access unit into a physical address using the functional node group ID extracted by the functional node group ID extraction unit and the storage management information and inputs the physical address to the storage element, the storage access control unit forms, based on data read from the storage element and the functional node group ID, the local communication request to the functional node to which the read data is to be transferred when an access type of the access control information extracted from the local communication request indicates reading, and transfers the local communication request to the functional node group management unit, and the functional node management unit converts the local communication request transferred from the functional access control unit into the global communication request and transmits the global communication request from the functional node input/output port.

11. A parallel calculation method of a parallel calculation system that includes a plurality of functional nodes having a mathematical operation function, an input/output function or a storage function, or a combination of the functions, for carrying out information processing, and a plurality of network switches, which serve as part of a communication path for communication between the functional nodes and function as communication channels, the parallel calculation system executing a plurality of processes, the method comprising:

a step by the functional nodes of preparing a functional component having a mathematical operation function, an input/output function or a storage function, or a combination of the functions, for carrying out information processing;

a step by the functional nodes of preparing a functional node input/output port that is a port for inputting and outputting a communication request transferred between the functional nodes for carrying out interactive communication between the functional nodes;

a functional node group management step by the functional nodes of managing, as one group, a functional node group made up of part or all of a plurality of the functional nodes that the parallel calculation method includes, the functional node group being assigned to one of the plurality of processes;

a step by the network switches of preparing a plurality of input/output ports that are ports for inputting and outputting the communication request;

a step by the network switches of preparing a switch that outputs the communication request that the input/output port inputs to the input/output port; and a bandwidth management step by the network switches of managing a communication bandwidth for each of the communication channels between the functional nodes that belong to the functional node group and controlling the switch, wherein a local communication request, which is a communication request for carrying out interactive communication only between a plurality of the functional nodes that make up the functional node group, is used for communication between a plurality of the functional nodes that make up the functional node group;

a global communication request, which carries out interactive communication between all the functional nodes that make up the parallel calculation system, is used for communication on the communication path; and the functional node group management step further includes a functional node management information holding step of managing information used in converting the local communication request into the global communication request or the global communication request into the local communication request, and a communication request conversion step of using the information managed by the functional node management information holding step to convert the local communication request, which the functional component inputs or outputs, into the global communication request, which the functional node input/output port inputs or outputs, or the global communication request into the local communication request.

12. The parallel calculation method according to claim 11, wherein the functional nodes further include a power supply fv control step of performing a process of controlling the turning on and off of the power supply of the functional nodes, a process of controlling operating frequency of the functional nodes, or a process of controlling operating voltage of the functional nodes, or a combination of the processes.

13. The parallel calculation method according to claim 11, wherein the local communication request and the global communication request include privilege control information, which is information indicating whether the local communication request or global communication request is a privileged communication request; and the functional nodes further include a privilege level storage step of keeping a upper limit value of a privilege level of the privilege control information of the global communication request that the functional nodes can transmit from the functional node input/output port.

14. The parallel calculation method according to claim 11, wherein the bandwidth management step further includes:

a bandwidth management information holding step of keeping the mapping of the communication channels, which include the network switch as part of the communication channels, to communication bandwidths assigned to the communication channels; and a switch control step of controlling the switch of the network switch in accordance with the bandwidth management information.

15. The parallel calculation method according to claim 11, further comprising:

a step by the network switches of preparing a plurality of input ports and output ports corresponding to the input/output ports of the network switches;

a step by the network switches of preparing a multiplexer that controls the communication channel for each of a plurality of the input ports and has outputs corresponding to a plurality of the output ports;
a step by the network switches of preparing a buffer in which global communication requests accumulate for each of the outputs of the multiplexer; and
a bandwidth control step of outputting to the output ports the global communication requests that are accumulated in a plurality of the buffers whose output destination is the output port of each of a plurality of the multiplexers.

16. The parallel calculation method according to claim 15, wherein
the bandwidth control step carries out a process for a plurality of the buffers, by which the global communication request is received by the bandwidth control step, at a rate proportional to a communication bandwidth assigned to each of the communication channels in a round-robin fashion.

17. The parallel calculation method according to claim 11, wherein
the network switches further include a network switch power supply fv control step of performing a process of controlling the turning on and off of the power supply of the network switch, a process of controlling operating frequency of the network switch, or a process of controlling operating voltage of the network switch, or a combination of the processes.

18. The parallel calculation method according to claim 17, wherein
the functional node includes a power supply fv control node that controls a plurality of operations at the network switch power supply fv control step that makes up the communication path through an exclusive communication path.

19. The parallel calculation method according to claim 11, wherein
the functional node includes a MMU-equipped storage node that allows shared access from a plurality of the functional node groups and enables a storage function to be shared.

20. The parallel calculation method according to claim 19, wherein:
in addition to the functional node group management step, the privilege level storage step, the power supply fv control step and a step of preparing the functional node input/output port, the MMU-equipped storage node includes:
a functional node group ID extraction step by the MMU-equipped storage node of extracting a functional node group ID from the global communication request input from the functional node input/output port;
a step by the MMU-equipped storage node of preparing a storage element for reading and writing data using a physical address and a reading/writing control signal;
a storage access control step by the MMU-equipped storage node of extracting access control information for the storage element from the local communication request that the functional node group management step creates by converting the global communication request, and controlling the reading and writing of data for the storage element using a logical address of the extracted access control information;
a storage management information holding step by the MMU-equipped storage node of holding the logical address for each of the functional node groups and conversion information of a physical address for accessing the storage element; and
a MMU by which the MMU-equipped storage node converts a logical address output from the storage access step into a physical address using the functional node group ID extracted by the functional node group ID extraction step and the storage management information and inputs the physical address to the storage element;
the storage access control step forms, based on data read from the storage element and the functional node group ID, the local communication request to the functional node to which the read data is to be transferred when an access type of the access control information extracted from the local communication request indicates reading, and transfers the local communication request to the functional node group management step; and
the functional node management step converts the local communication request transferred from the functional access control step into the global communication request and transmits the global communication request from the functional node input/output port.

21. A non-transitory computer-readable medium stored therein a management program of a parallel calculation system that includes a plurality of functional nodes having a mathematical operation function, an input/output function or a storage function, or a combination of the functions, for carrying out information processing, and a plurality of network switches, which serve as part of a communication path for communication between the functional nodes and function as communication channels, the program causing a computer to function as the parallel calculation system, wherein
the parallel calculation system executes a plurality of processes,
the functional nodes include:
a functional component having a mathematical operation function, an input/output function or a storage function, or a combination of the functions, for carrying out information processing;
a functional node input/output port that is a port for inputting and outputting a communication request transferred between the functional nodes for interactive communication between the functional nodes; and
a functional node group management unit that manages, as one group, a functional node group made up of part or all of a plurality of the functional nodes that the parallel calculation system includes, the functional node group being assigned to one of the plurality of processes, and
the network switches include:
a plurality of input/output ports that are ports for inputting and outputting the communication request;
a switch that outputs the communication request that the input/output port inputs to the input/output port; and
a bandwidth management unit that manages a communication bandwidth for each of the communication channels between the functional nodes belonging to the functional node group and controls the switch, wherein
a local communication request, which is a communication request for carrying out interactive communication only between a plurality of the functional nodes that make up the functional node group, is used for communication between plurality of the functional nodes that make up the functional node group;
a global communication request, which carries out interactive communication between all the functional nodes that make up the parallel calculation system, is used for communication on the communication path; and
the functional node group management unit includes
a functional node management information holding unit that manages information used in converting the local communication request into the global communication request or the global communication request into the local communication request, and a communication request conversion unit that uses the information managed by the functional node management information holding unit to convert the local communication request, which the functional component inputs or outputs, into the global communication request, which the functional node input/output port inputs or outputs, or the global communication request into the local communication request.

* * * * *